United States Patent
Nunez

[11] Patent Number: 5,961,263
[45] Date of Patent: Oct. 5, 1999

[54] TRUCK BED CARGO RESTRAINT SYSTEM

[76] Inventor: Luis Alberto Nunez, P.O. Box 89-3011, Birri, Barva Heredia, Costa Rica, 3011

[21] Appl. No.: 09/090,182

[22] Filed: Jun. 4, 1998

[51] Int. Cl.⁶ ..................................................... B60P 7/08
[52] U.S. Cl. ........................... 410/103; 410/100; 410/104; 410/105; 410/106; 410/117
[58] Field of Search ..................................... 410/103, 104, 410/100, 105, 12, 8, 97, 106, 110, 117; 254/223, 323, 329; 24/68 CD, 265 CD; 248/499

[56] References Cited

U.S. PATENT DOCUMENTS

| | | | |
|---|---|---|---|
| 4,229,131 | 10/1980 | Hague | 410/12 |
| 4,367,993 | 1/1983 | Meigs | 410/103 |
| 4,382,736 | 5/1983 | Thomas | 410/104 |
| 4,475,854 | 10/1984 | Ericsson | 410/103 |
| 4,842,458 | 6/1989 | Carpenter | 410/103 X |
| 5,020,948 | 6/1991 | Ihara | 410/105 |
| 5,338,136 | 8/1994 | Hetchler | 410/100 |
| 5,533,848 | 7/1996 | Davis | 410/105 |
| 5,664,918 | 9/1997 | Heider et al. | 410/103 |
| 5,800,105 | 9/1998 | Stump | 410/103 |

Primary Examiner—Stephen T. Gordon

[57] ABSTRACT

A cargo restraining system for a truck bed is provided including at least one crank unit mounted to a side of the truck bed. Also included is a flexible, inelastic strap having at least one end coupled to the crank unit. This allows the tightening of the strap to restrain cargo within the truck bed.

3 Claims, 2 Drawing Sheets

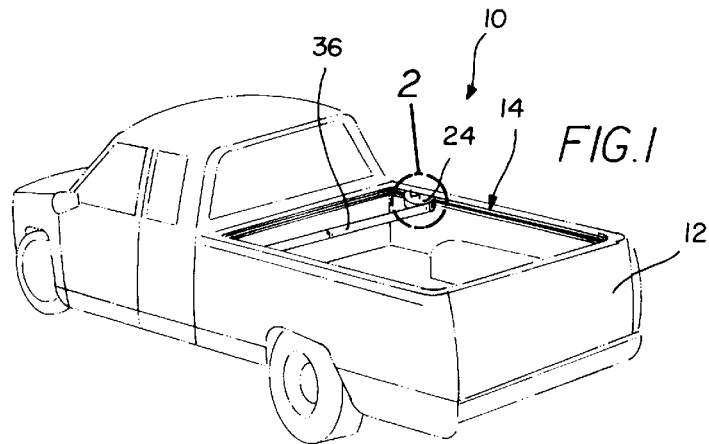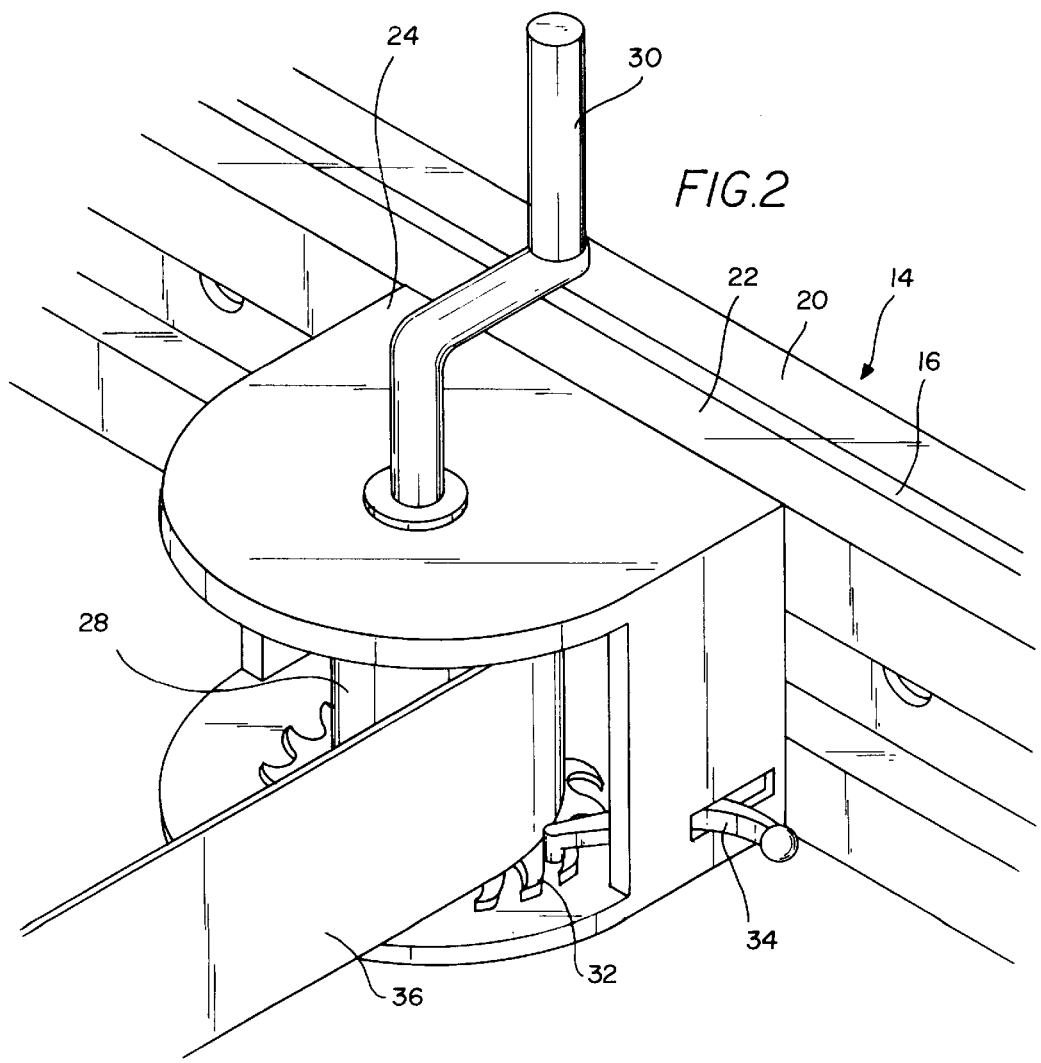

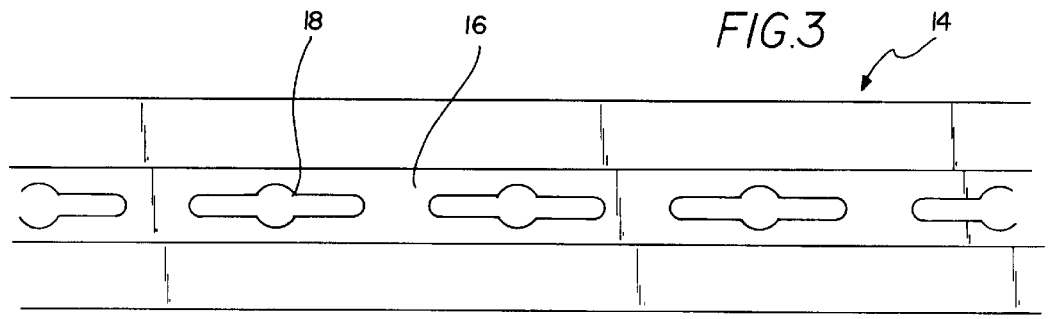
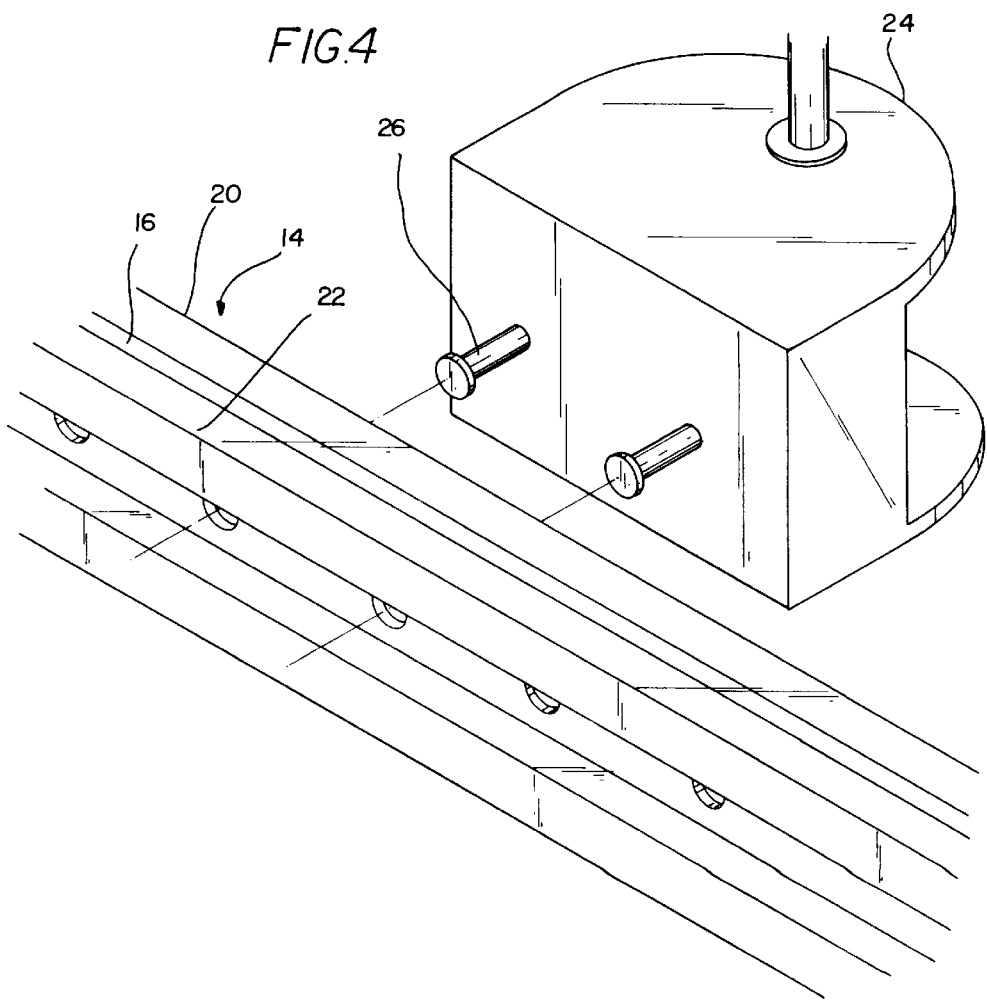

TRUCK BED CARGO RESTRAINT SYSTEM

BACKGROUND OF THE INVENTION

1. Field of the Invention

The present invention relates to truck bed restraint straps and more particularly pertains to a new truck bed cargo restraint system for containing cargo within selected areas of a truck bed for transportation purposes.

2. Description of the Prior Art

The use of truck bed straps is known in the prior art. More specifically, truck bed straps heretofore devised and utilized are known to consist basically of familiar, expected and obvious structural configurations, notwithstanding the myriad of designs encompassed by the crowded prior art which have been developed for the fulfillment of countless objectives and requirements.

Known prior art truck bed straps include U.S. Pat. No. 4,842,458; U.S. Pat. No. 5,282,706; U.S. Pat. No. 5,346,153; U.S. Pat. No. 3,033,488; U.S. Pat. No. 772,157; and Foreign Patents EP 0 523 032 A1 & EP 0 634 350 A1.

In these respects, the truck bed cargo restraint system according to the present invention substantially departs from the conventional concepts and designs of the prior art, and in so doing provides an apparatus primarily developed for the purpose of containing cargo within selected areas of a truck bed for transportation purposes.

SUMMARY OF THE INVENTION

In view of the foregoing disadvantages inherent in the known types of truck bed restraint straps now present in the prior art, the present invention provides a new truck bed cargo restraint system construction wherein the same can be utilized for containing cargo within selected areas of a truck bed for transportation purposes.

The general purpose of the present invention, which will be described subsequently in greater detail, is to provide a new truck bed cargo restraint system apparatus and method which has many of the advantages of the truck bed restraint straps mentioned heretofore and many novel features that result in a new truck bed cargo restraint system which is not anticipated, rendered obvious, suggested, or even implied by any of the prior art truck bed restraint straps, either alone or in any combination thereof.

To attain this, the present invention generally comprises a truck bed having a rectangular bottom wall. As shown in FIG. 1, a side wall is coupled to a periphery of the bottom wall and extends upwardly therefrom to define an open top and an upper peripheral edge. The side wall is defined by a pair of opposed side faces and a pair of opposed end faces. Also included is a rail assembly having a thin planar rectangular strip constructed from a rigid material. The strip of the rail assembly lines an interior surface of the entire side wall adjacent to the upper peripheral edge. As shown in FIG. 3, the rectangular strip has a plurality of equally spaced cut outs formed therein along its entire length. Each cut out includes a horizontally oriented oval portion with a circular portion having an enlarged height situated at a central extent thereof. As shown in FIGS. 2–4, the rail assembly also includes a pair of outboard elastomeric bushings mounted between the interior surface of the side wall of the truck bed and the strip. The elastomeric bushings are preferably situated along a top and bottom exterior edge of the rail both above and below the associated cut outs. Associated therewith is a pair of inboard elastomeric bushings mounted along a top and bottom interior edge of the strip both above and below the associated cut outs for reasons that will soon become apparent. Next provided is a pair of crank units each including a planar rear face with a pair of laterally situated couples. Each couple is equipped with a cylindrical inboard extent and a disk-shaped outboard extent. Note FIG. 4. A top and bottom face is integrally coupled to top and bottom edges of the rear face, respectively. The top and bottom face extend from the rear face to define an interior space and an open front. A vertically oriented spool is rotatably mounted between the top and bottom face of the crank unit. A crank with a Z-shaped configuration is coupled to the spool and extends upwardly from the top face of the crank unit. For allowing the rotation of the spool only in a single direction, a ratchet mechanism is provided. The ratchet mechanism functions for allowing rotation of the spool only in the single direction until the release of a gear release lever. Finally, a flexible, inelastic nylon strap is provided having ends coupled to the spools of the crank units. In use, the crank units are releasably mounted to the rails on opposed faces of the truck bed at selected locations. This allows the tightening of the nylon strap to restrain cargo.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new truck bed cargo restraint system apparatus and method which has many of the advantages of the truck bed restraint straps mentioned heretofore and many novel features that result in a new truck bed cargo restraint system which is not anticipated, rendered obvious, suggested, or even implied by any of the prior art truck bed restraint straps, either alone or in any combination thereof.

It is another object of the present invention to provide a new truck bed cargo restraint system which may be easily and efficiently manufactured and marketed.

It is a further object of the present invention to provide a new truck bed cargo restraint system which is of a durable and reliable construction.

An even further object of the present invention is to provide a new truck bed cargo restraint system which is susceptible of a low cost of manufacture with regard to both materials and labor, and which accordingly is then susceptible of low prices of sale to the consuming public, thereby making such truck bed cargo restraint system economically available to the buying public.

Still yet another object of the present invention is to provide a new truck bed cargo restraint system which provides in the apparatuses and methods of the prior art some of the advantages thereof, while simultaneously overcoming some of the disadvantages normally associated therewith.

Still another object of the present invention is to provide a new truck bed cargo restraint system for containing cargo within selected areas of a truck bed for transportation purposes.

Even still another object of the present invention is to provide a new truck bed cargo restraint system that includes at least one crank unit mounted to a side of the truck bed. Also included is a flexible, inelastic strap having at least one end coupled to the crank unit. This allows the tightening of the strap to restrain cargo within the truck bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new truck bed cargo restraint system according to the present invention.

FIG. 2 is a top perspective view of the present invention.

FIG. 3 is an inner side view of the rail assembly of the present invention.

FIG. 4 is an exploded view of the present invention.

DESCRIPTION OF THE PREFERRED EMBODIMENT

With reference now to the drawings, and in particular to FIGS. 1 through 4 thereof, a new truck bed cargo restraint system embodying the principles and concepts of the present invention and generally designated by the reference numeral 10 will be described.

The present invention, designated as numeral 10, includes a truck bed 12 having a rectangular bottom wall. As shown in FIG. 1, a side wall is coupled to a periphery of the bottom wall and extends upwardly therefrom to define an open top and an upper peripheral edge. The side wall is defined by a pair of opposed side faces and a pair of opposed end faces.

Also included is a rail assembly 14 having a thin planar rectangular strip 16 constructed from a rigid material. The strip of the rail assembly lines an interior surface of each of the faces of the side wall adjacent to the upper peripheral edge. As shown in FIG. 3, the rectangular strip has a plurality of equally spaced cut outs 18 formed therein along its entire length. Each cut out includes a horizontally oriented oval portion with a circular portion having an enlarged height situated at a central extent of the oval portion.

As shown in FIGS. 2–4, the rail assembly also includes a pair of outboard elastomeric bushings 20 mounted between the interior surface of the side wall of the truck bed and the strip. The elastomeric bushings are preferably situated along a top and bottom exterior edge of the rail both above and below the associated cut outs. Associated therewith is a pair of inboard elastomeric bushings 22 mounted along a top and bottom interior edge of the strip both above and below the associated cut outs for reasons that will soon become apparent. As shown in the Figures, the bushings each have a common uniform size. In the preferred embodiment, the bushings have a depth of at least twice that of the strip of the rail assembly and a height about ⅓ that of the strip.

Next provided is a pair of crank units 24 each including a planar rear face with a pair of laterally situated couples 26. Each couple is equipped with a cylindrical inboard extent and a disk-shaped outboard extent. Note FIG. 4. A top and bottom face is integrally coupled to top and bottom edges of the rear face of each crank unit, respectively. The top and bottom face extend from the rear face to define an interior space and an open front having an arcuate front periphery. A vertically oriented spool 28 is rotatably mounted between the top and bottom face of the crank unit. A crank 30 with a Z-shaped configuration is coupled to the spool and extends upwardly from the top face of the crank unit. For allowing the rotation of the spool only in a single direction, a ratchet mechanism 32 is provided. The ratchet mechanism functions for allowing the rotation of the spool in an opposite direction upon the release of a gear release lever 34. Such gear release lever includes a pawl and a handle which extends from a side face mounted between the top and bottom face of the crank unit.

Finally, a flexible, inelastic nylon strap 36 is provided having ends coupled to the spools of the crank units. In use, the crank units are releasably mounted to the rails on any face of the truck bed at selected locations. This allows the tightening of the nylon strap to restrain cargo.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cargo restraining system for a truck bed comprising, in combination:

a truck bed including a rectangular bottom wall and a side wall coupled to a periphery of the bottom wall and extending upwardly therefrom to define an open top and an upper peripheral edge, wherein the side wall is defined by a pair of opposed side faces and a pair of opposed end faces;

a rail assembly including a thin planar rectangular strip constructed from a rigid material lining an interior surface of the entire side wall adjacent to the upper peripheral edge thereof, the rectangular strip having a plurality of equally spaced cut outs formed therein along a length thereof, each cut out including a horizontally oriented oval portion with a circular portion having an enlarged height situated at a central extent of the oval portion, the rail assembly including a pair of outboard elastomeric bushings mounted between the interior surface of the side wall of the truck bed and along a top and bottom exterior edge of the strip both above and below the associated cut outs, the rail assembly further including a pair of inboard elastomeric bushings mounted along a top and bottom interior edge of the strip both above and below the associated cut outs;

a pair of crank units each including a planar rear face with a pair of laterally situated couples each with a cylindrical inboard extent and a disk-shaped outboard extent, a top and bottom face integrally coupled to top and bottom edges of the rear face, respectively, and extending therefrom to define an interior space and an open front, a vertically oriented spool rotatably mounted between the top and bottom face of the crank unit, a crank with a Z-shaped configuration coupled to the spool and extending upwardly from the top face of the crank unit, and a ratchet mechanism for allowing the rotation of the spool only in a single direction until the release of a gear release lever; and a flexible, inelastic nylon strap having ends coupled to the spools of the crank units, wherein the crank units are releasably mounted to the rail assembly on opposed faces of the truck bed at selected locations thereby allowing the tightening of the nylon strap to restrain cargo.

2. A cargo restraining system comprising:

at least one crank unit mounted to a side of a truck bed;

a flexible, inelastic strap having at least one end coupled to the crank unit, thereby allowing the tightening of the strap to restrain cargo;

wherein the crank unit is removably coupled to a selected portion of the truck bed;

wherein the crank unit is removably coupled to one of a plurality of cut outs formed in a rigid strip mounted on the truck bed; and wherein the strip has a pair of elastomeric bushings mounted thereon for being situated between the strip and the crank unit.

3. A cargo restraining system for a truck bed as set forth in claim 2 wherein the crank unit includes a ratchet mechanism.

* * * * *